United States Patent [19]

Ueda

[11] Patent Number: 4,839,725

[45] Date of Patent: Jun. 13, 1989

[54] CONTOUR COMPENSATING CIRCUIT

[75] Inventor: Kazuhiko Ueda, Yokohama, Japan

[73] Assignee: Victor Company of Japan, Ltd., Kanagawa, Japan

[21] Appl. No.: 195,976

[22] Filed: May 19, 1988

[30] Foreign Application Priority Data

May 19, 1987 [JP] Japan .................. 62-122077

[51] Int. Cl.$^4$ .......... H04N 5/14; H04N 5/208
[52] U.S. Cl. .................. 358/160; 358/166; 358/162; 358/96
[58] Field of Search ............ 358/160, 162, 166, 37, 358/96

[56] References Cited

U.S. PATENT DOCUMENTS

| | | | |
|---|---|---|---|
| 3,995,108 | 11/1976 | Morrison | 358/162 |
| 4,142,211 | 2/1979 | Faroudja | 358/162 |
| 4,275,417 | 6/1981 | Esashika | 358/162 |
| 4,654,709 | 3/1987 | Umezawa | 358/162 |

FOREIGN PATENT DOCUMENTS

| | | | |
|---|---|---|---|
| 53-88521 | 8/1978 | Japan | 358/160 |
| 9153379 | 1/1984 | Japan | 358/160 |
| 0102064 | 6/1985 | Japan | 358/160 |
| 60-169280 | 9/1985 | Japan . | |
| 61-15472 | 1/1986 | Japan . | |
| 61-220567 | 9/1986 | Japan . | |

Primary Examiner—James J. Groody
Assistant Examiner—Michael D. Parker
Attorney, Agent, or Firm—Holman & Stern

[57] ABSTRACT

To adjust frequency characteristics (e.g. peak frequency or emphasizing frequency range) of a contour compensating circuit (i.e. edge emphasizer) for correcting scanning beam aperture distortion of a video camera, for instance, the contour compensating circuit comprises a first delay line for delaying a first signal Sa into a second signal Sb; a second delay line for delaying the second singal Sb into a third signal Sc; and a matrix mixer for mixing three signals Sa, Sb and Sc at a matrix mixture ratio of $(\alpha-1):-\alpha:1$ and outputting the mixed signal $Sd=Sc-\alpha Sb+(\alpha-1)Sa$ as a contour compensating signal. The above mixture ratio is controllled on the basis of an automatic gain control detection voltage derived from the AGC circuit for the video camera.

6 Claims, 4 Drawing Sheets

CONTOUR COMPENSATING CIRCUIT

BACKGROUND OF THE INVENTION

1. Field of the Invention

The present invention relates to an improvement in contour compensating circuits (i.e. horizontal edge emphasizing circuits) to be incorporated in a video camera, for instance, in order to compensate aperture distortion of a scanning beam spot within an image pickup tube.

2. Prior Art

FIG. 1A shows an example of prior-art contour compensating circuit composed of an input terminal 1, an amplifier 2, a Δt delay line 3, a comparator 4, and an output terminal 5. When a video signal (e.g. brightness signal) generated from an image signal generating element (e.g. image pickup tube) as shown by (A) in FIG. 1B is inputted to the input terminal 1, this signal is amplified by the amplifier 2 and then applied to the Δt delay line 3 via an impedance R to delay the amplified signal by a timer period Δt, as shown by (C) in FIG. 1B. This delay-line output signal is reflected at point C in FIG. 1A due to impedance mismatching between the delay line 3 and the comparator 4 and therefore returned to point B with a delay time Δt through the same delay line 3, as shown by (B) in FIG. 1B. At this point B, the reflected signal will not be further reflected due to impedance matching between the impedance R and the delay line 3. Therefore, the signal waveform at point B can be represented as (B) in FIG. 1B and that at point C can be represented as (C) in the same figure. These two signals as shown by (B) and (C) are compared by the comparator 4, and a comparator output signal (i.e. differential signal) as shown by (D) is outputted from the output terminal 5 as a contour compensating signal (i.e. edge signal). This edge signal is added to a main signal transmission line (not shown) connected to point C in FIG. 1A to perform contour compensation or edge emphasization.

The frequency characteristics of the above-mentioned contour compensating circuit can be expressed in the same way as in cosine-filter characteristics in digital transmission as follows:

$$F_1(\omega) = \tfrac{1}{2}(1 - \cos \cdot \omega)$$

These characteristics can be represented by solid curve shown in FIG. 1C, in which the peak frequency $\omega_0$ is dependent upon the delay time of the delay line 4. For example, if $\Delta t = 200$ ns, $f_0 = \omega_0/2\pi = 2.5$ MHz.

In the prior-art contour compensating circuit, however, there exists a problem in that the frequency characteristics are fixedly determined and therefore unadjustable as shown by the solid curve in FIG. 1C. In other words, when the output signal is required to be emphasized only within the high frequency range, since the output signal is simultaneously emphasized even within the medium frequency range, it is impossible to obtain required frequency characteristics as shown by dashed curve in FIG. 1C. Further, there exists another problem in that the peak value is also unadjustable because the delay time of the delay line is fixedly determined.

SUMMARY OF THE INVENTION

With these problems in mind, therefore, it is the primary object of the present invention to provide a contour compensating circuit adjustable in frequency characteristics and emphasization peak value for providing an effective contour compensation suitable to be applied to characteristics of an individual video camera in the production process.

To achieve the above-mentioned object, a contour compensating circuit of the present invention comprises: (a) first delay line means for delaying a first signal by a first predetermined delay time and outputting a second signal; (b) second delay line means, coupled to said first delay line means, for further delaying the second signal by a second predetermined delay time and outputting a third signal; (c) delay line driving means, coupled to said first delay line means, for driving said first and second delay line means; and (d) matrix mixing means, coupled to said delay line driving means, said first delay line means and said second delay line means, for mixing the first, second and third signals at a matrix mixture ratio of $(\alpha - 1):-\alpha:1$ and outputting a mixed signal as a contour compensating signal.

Further, the circuit of the present invention can be characterized in that the matrix mixture ratio of said matrix mixing means is controlled on the basis of an automatic gain control detection voltage derived from an AGC circuit for an imaging device which generates the first signal.

BRIEF DESCRIPTION OF THE DRAWINGS

The features and advantages of the contour compensating circuit according to the present invention will be more clearly appreciated from the following description taken in conjunction with the accompanying drawings in which.

DETAILED DESCRIPTION OF THE INVENTION

Figure 2A:
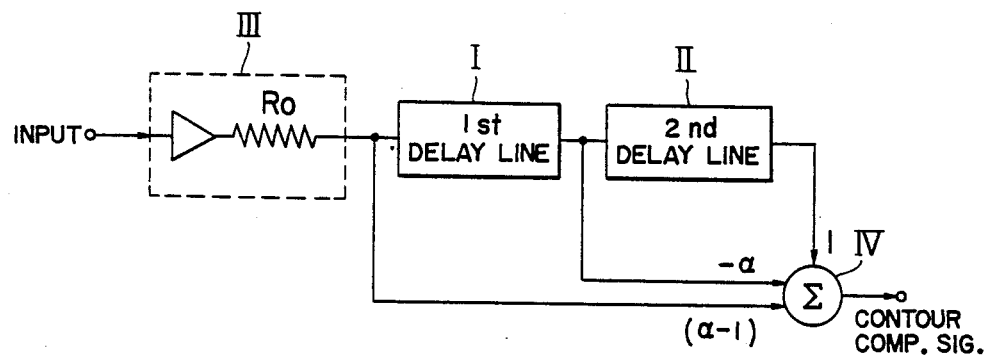
FIG. 2A is a schematic block diagram showing a basic circuit configuration of the contour compensating circuit according to the present invention.

FIG. 2A shows a basic circuit configuration of a contour compensating circuit of a present invention, which comprises a first delay line (first delay line means) I for delaying an input signal applied to the first delay line by a predetermined delay time, a second delay line (second delay line means) II for further delaying a signal delayed by the first delay line by a second predetermined delay time; a delay line driver circuit (delay line driving means) III for driving the first and second delay lines; and a matrix mixer (matrix mixing means) IV for mixing three signals of the input signal to the delay line, the output signal from the first delay line, and an output signal from the second delay line at a matrix mixture ratio of $(\alpha-1):-\alpha:1$ and outputting a mixed signal as a contour compensating signal.

Further, the above matrix mixture ratio in the matrix mixer is controlled in response to an automatic gain control detection voltage applied from an AGC circuit incorporated in an image pickup tube, for instance.

Figure 2B:
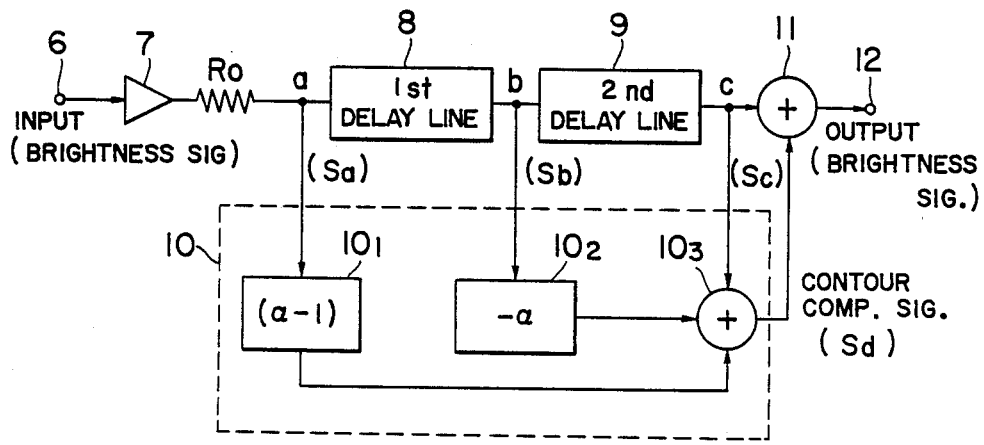
FIG. 2B is a schematic block diagram showing an embodiment of the contour compensating circuit according to the present invention.

FIG. 2B shows an embodiment of the basic contour compensating circuit shown in FIG. 2A. The circuit shown in FIG. 2B comprises an input terminal 6; a delay line driver circuit including an amplifier 7 and an impedance $R_O$; a first delay line 8, a second delay line 9; a matrix mixer 10 composed of a first multiplier $10_1$, a second multiplier $10_2$ and an adder $10_3$; a compensating signal adder 11; and an output terminal 12.

Video signals (e.g. brightness signals) outputted from an image signal generating element (e.g. an image pickup tube) are applied to the input terminal 6, amplified by the amplifier 7 and the supplied to the first delay line 8 through the impedance $R_O$ determined equal to the characteristic impedance of the first delay line 8. Further, the output of the first delay line 8 is applied to the second delay line 9. A signal applied to the first and second delay lines 8 and 9 is delayed by a predetermined time ($\Delta t$), respectively in this embodiment. Further, the delay line driver circuit composed of the amplifier 7 and the impedance $R_O$ drives both the two delay lines 8 and 9.

In FIG. 2B, since the impedance at point C is fairly high in comparison with that of the second delay line 9, the output signal from the second delay line 9 is reflected backward or returned to the first delay line 8 via the second delay line 9 owing to impedance mismatching. On the other hand, since the impedance of the first delay line 8 is substantially equal to the impedance $R_O$ (impedance matching) the signal reflection is terminated at the impedance $R_O$. Therefore, three signals Sa, Sb and Sc at points a, b and c can be expressed, respectively, as follows:

$$Sa=(y_0+y_4)/2$$

$$Sb=(y_1+y_3)/2$$

$$Sc=y_2$$

where
$y_0$ denotes the signal inputted to the input terminal 6;
$y_1$ denotes the signal delayed by $\Delta t$ from $y_0$;
$y_2$ denotes the signal delayed by $\Delta t$ from $y_1$;
$y_3$ denotes the signal delayed by $\Delta t$ from $y_2$; and
$y_4$ denotes the signal delayed by $\Delta t$ from $y_3$.

These three signals Sa, Sb and Sc are applied to the matrix mixer 10. The signal Sa is multiplied by $(\alpha-1)$ through the first multiplier $10_1$ and the signal Sb is multiplied by $(-\alpha)$ through the second multiplier $10_2$. These two multiplied signals $(\alpha-1)Sa$ and $(-\alpha)Sb$ and the signal Sc are added by the adder $10_3$. The added signal Sd is outputted from the adder $10_3$ as a mixed contour compensating signal (edge signal):

$$S_d=S_c-\alpha Sb+(\alpha-1)Sa.$$

Therefore, the frequency characteristics of this matrix mixer 10 can be given as:

$$F_2(\omega)=1-\alpha\cos\omega+(\alpha-1)\cos 2\omega.$$

Further, this contour compensating signal Sd is added to the original signal transmitted through point C in FIG. 2B by the compensating signal adder 11, and then outputted from the output terminal 12 as a brightness signal whose contour has been compensated (i.e. whose edge has been emphasized).

Figure 1A:
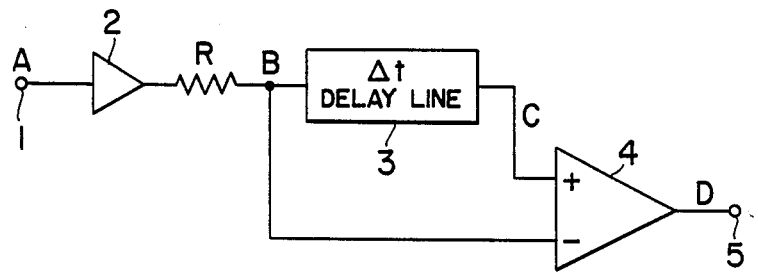
FIG. 1A is a schematic block diagram showing an example of prior-art contour compensating circuits.
Figure 1B:
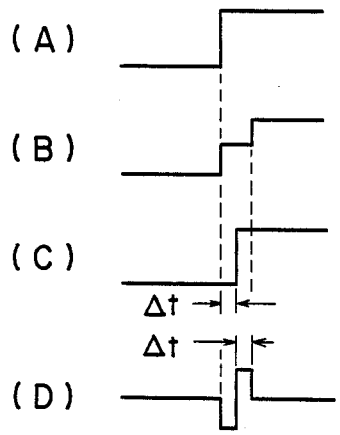
FIG. 1B is a timing chart of various waveforms at various points in the circuit shown in FIG. 1A.
Figure 1C:
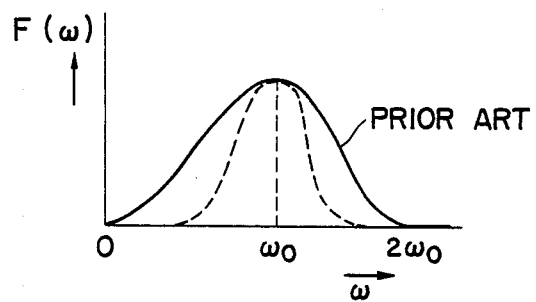
FIG. 1C is a graphical representation showing exemplary characteristics of the circuit shown in FIG. 1A.
Figure 3:
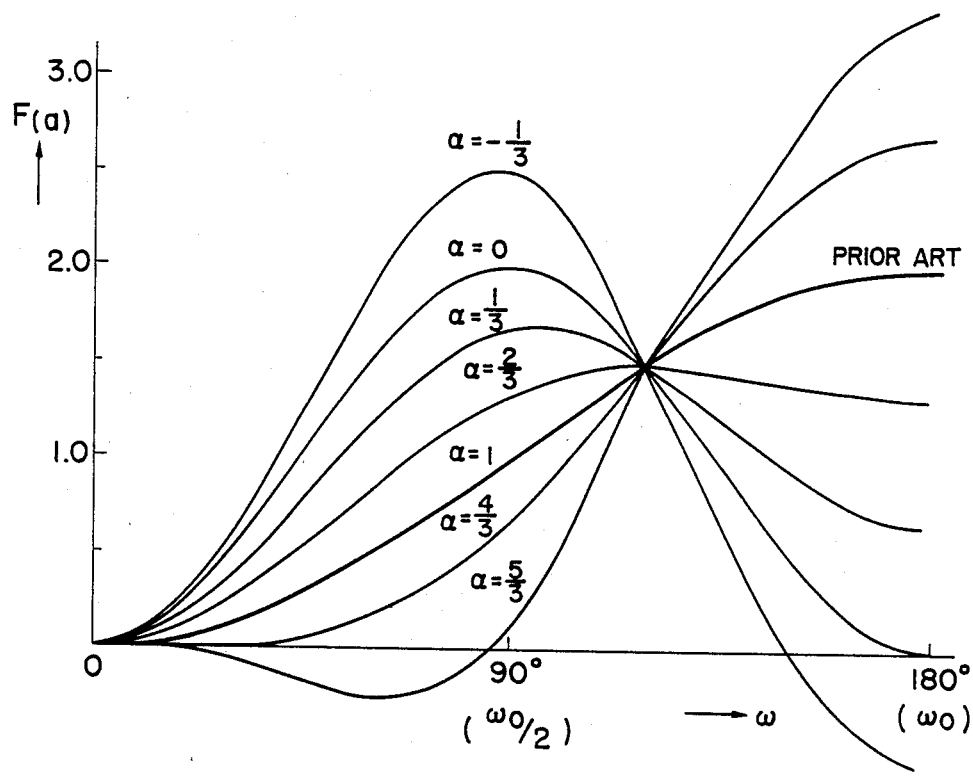
FIG. 3 is a graphical representation showing variable frequency characteristics of the contour compensating circuit of the present invention.

FIG. 3 shows the frequency characteristics of the contour compensating circuit of the present invention, in which the mixture ratio $\alpha$ is varied between $-\frac{1}{3}$ and 5/3. In FIG. 3, the curve of $\alpha=1$ represents the frequency characteristic curve of the prior-art circuit shown by solid line in FIG. 1C. FIG. 3 indicates that the frequency characteristics are adjustable according to the value $\alpha$ as follows: Within the range $0 \leq \alpha < 1$, the peak frequency at which the amplitude is the maximum is lowered from $\omega_0$ (180°) to $\omega_0/2$ (90°). Within the range $1 < \leq 4/3$, the peak frequency is the same as that in the prior-art circuit. However, higher frequencies near the peak frequency $\omega_0$ are more emphasized. Within the range $4/3 < \alpha$, only higher frequency range near $\omega_0$ is emphasized and medium frequency range below $\omega_0/2$ is attenuated. Within the range $\alpha < 0$, higher frequency range is attenuated and only the medium frequency range is emphasized. As described above, it is possible to change the frequency characteristics of the contour compensating circuit according to the value $\alpha$.

In practice, this value $\alpha$ is varied according to an automatic gain control detection voltage. An application example of the contour compensating circuit of the present invention will be described hereinbelow. When the circuit is incorporated in a video camera, the noise generated from an image pickup tube or MOS type solid state image pickup elements is distributed toward higher frequency side i.e. the noise level is approximately proportional to the frequency increase. Therefore, when the illuminance upon an image subject to be recorded is reduced and therefore the AGC (automatic gain control) circuit starts operating to increase the sensitivity of the imaging device, only high frequency noise components become conspicuous. In this case, the value $\alpha$ is reduced in the matrix mixing circuit 10 in response to the AGC detection voltage $V_\alpha$. Once the value $\alpha$ is reduced below $\alpha=1$, since the peak frequency is shifted from the higher frequency range to the medium frequency range as shown in FIG. 3, it is possible to attenuate only high frequency noise components.

Figure 4A:
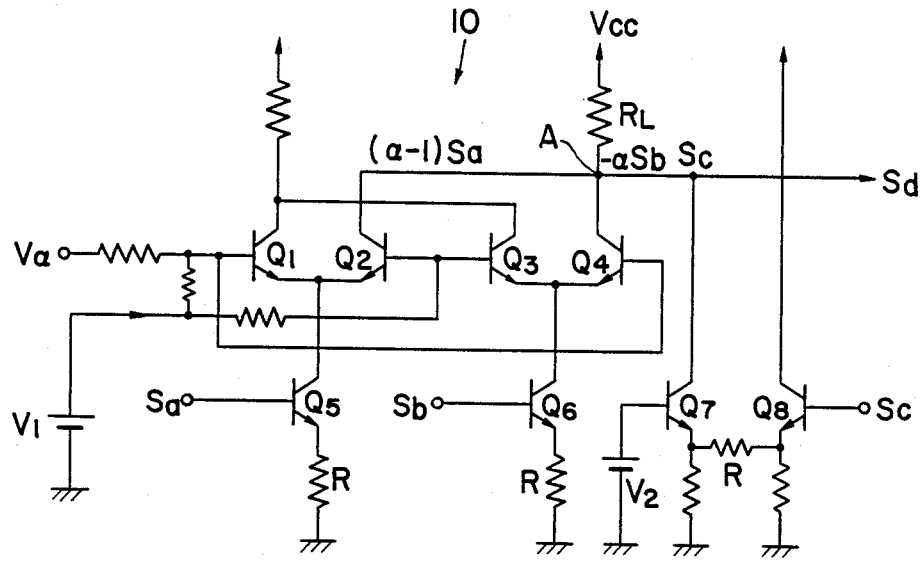
FIG. 4A is a circuit diagram showing a first example of a matrix mixing circuit incorporated in the contour compensating circuit according to the present invention.

FIG. 4A shows a first example of the matrix mixing circuit 10 by which the contour compensating signal Sd can be controlled in response to the AGC detection voltage $V_a$.

In FIG. 4A, the circuit 10 comprises a first differential amplifier composed of first and second transistors $Q_1$ and $Q_2$, a second differential amplifier composed of third and fourth transistors $Q_3$ and $Q_4$, a fifth transistor $Q_5$, a sixth transistor $Q_6$, a third differential amplifier composed of seventh and eighth transistors $Q_7$ and $Q_8$, a load resistor $R_L$, etc.

The base terminals of the transistors $Q_2$ and $Q_3$ are fixedly biased by a bias voltage $V_1$, while an AGC detection voltage $V_a$ is applied to the base terminals of the transistors $Q_1$ and $Q_4$, respectively. Each of the collector terminals of the transistors $Q_5$ and $Q_6$ is connected to the load resistor $R_L$ via each of the first and second differential amplifiers $Q_1$ and $Q_2$, $Q_3$ and $Q_4$, respectively. Therefore, the collector currents of these fifth and sixth transistors $Q_5$ and $Q_6$ are controlled by the first and second differential amplifiers, respectively. The third pair of transistors $Q_7$ and $Q_8$ constitutes a non-inversion amplifier.

In operation, when a signal Sc is applied to the base terminal of the transistor $Q_8$, a collector current of the transistor $Q_7$ flows through the load resistor $R_1$ in proportion to signal Sc, so that the potential at point A rises in phase with Sc. When a signal Sb is applied to the base terminal of the transistor $Q_6$, a collector current of the transistor $Q_6$ flows through the load resistor $R_L$ under control of the differential amplifier $Q_3$ and $Q_4$, so that the potential at point A is subjected to the influence of $V_a$ as $-\alpha Sb$. In the same way, when a signal Sa is applied to the base terminal of the transistor $Q_5$, a collector current of the transistor $Q_5$ flows through the load resistor $R_L$ under control of the differential amplifiers $Q_1$ and $Q_2$, so that the potential at point A is subjected to the influence of $V_a$ as $(\alpha-1)Sa$.

Therefore, it is possible to obtain an output edge signal Sd at point A as;

$$Sd = Sc - \alpha Sb + (\alpha-1)Sa.$$

In the contour compensating circuit shown in FIG. 4A, the circuit is operative only within the range $0 \leq \alpha \leq 1$.

Figure 4B:
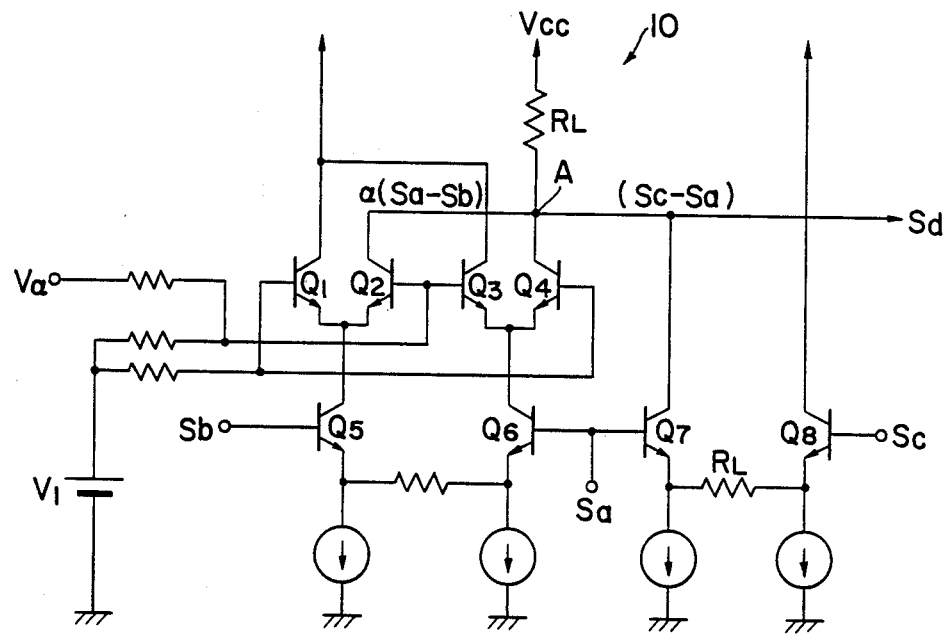
FIG. 4B is a similar circuit diagram showing a second example of the matrix mixing circuit incorporated in the contour compensating circuit according to the present invention.

FIG. 4B shows a second example of the matrix mixing circuit 10, in which the AGC detection voltage $V_\alpha$ can be freely varied. In this circuit, the transistors $Q_5$ and $Q_6$ are connected to each other to constitute another differential amplifier and further all the emitter resistances of the transistors $Q_5$, $Q_6$, $Q_7$ and $Q_8$ shown in FIG. 4A are replaced with constant current sources.

In operation, a signal (Sc−Sa) can be obtained between the two transistors $Q_5$ and $Q_6$ at point A; a signal (Sa−Sb) can be obtained between the two transistors $Q_5$ and $Q_6$ *1 and subjected to the influence of $V_a$* and $\alpha(Sa-Sb)$ at point A. Therefore, it is possible to obtain an output edge signal Sd at point A as;

$$Sd = Sc - \alpha Sb + (\alpha-1)Sa.$$

Further, in this circuit, the resistance $R_L$ of an emitter resistor connected between two transistors $Q_7$ and $Q_8$ is determined to be equal to the load resistor $R_L$.

As described above, in the contour compensating circuit of the present invention, since the frequency characteristics including the peak frequency of the circuit can be adjusted in response to an AGC detection voltage, it is possible to compensate the contour according to characteristics of each video camera, for instance.

What is claimed is:

1. A contour compensating circuit comprising:
   (a) first delay line means for delaying a first signal by a first predetermined delay time and outputting a second signal;
   (b) second delay line means, coupled to said first delay line means, for further delaying the second signal by a second predetermined delay time and outputting a third signal;
   (c) delay line driving means, coupled to said first delay line means, for driving said first and second delay line means; and
   (d) matrix mixing means, coupled to said delay line driving means, said first delay line means and said second delay line means, for mixing the first, second and third signals at a matrix mixture ratio of $(\alpha-1):-\alpha:1$ and outputting a mixed signal as a contour compensating signal.

2. The contour compensating circuit as set forth in claim 1, wherein the matrix mixture ratio of said matrix mixing means is controlled on the basis of an automatic gain control detection voltage derived from an AGC circuit for an imaging device which generates said first signal.

3. The contour compensating circuit as set forth in claim 1, wherein an impedance of said second delay line means mismatches that of said matrix mixing means so that the third signal is reflected backward from an output of said second delay line means.

4. The contour compensating circuit as set forth in claim 3, wherein an impedance of said first delay line means matches that of said delay line driving means so that the reflected third signal is terminated at an input of said first delay line means.

5. The contour compensating circuit as set forth in claim 4, wherein when the first and second predetermined delay times $\Delta t$ are equal to each other, the first, second and third signals Sa, Sb, and Sc are expressed as:

$$Sa = (y_0 + y_4)/2$$

$$Sb = (y_1 + y_3)/2$$

$$Sc = y_2$$

where
   $y_0$ denotes a signal inputted to said delay line driving means;
   $y_1$ denotes a signal delayed by $\Delta t$ from $y_0$;
   $y_2$ denotes a signal delayed by $\Delta t$ from $y_1$;
   $y_3$ denotes a signal delayed by $\Delta t$ from $y_2$; and
   $y_4$ denotes a signal delayed by $\Delta t$ from $y_3$.

6. The contour compensating circuit as set forth in claim 1, wherein said matrix mixing means comprises:
   (a) a first multiplier, connected to between said delay line driving means and said first delay line means, for multiplying the first signal Sa by $(\alpha-1)$;
   (b) a second multiplier, connected to between said first delay line means and said second delay line means, for multiplying the second signal Sb by $(-\alpha)$; and
   (c) an adder, connected to said first and second multipliers and said second delay line means outputting the third signal Sc, for finding an addition signal Sd of these three signals as:

$$Sd = Sc - \alpha Sb + (\alpha-1)Sa$$

and outputting the addition signal Sd as a contour compensating signal.

* * * * *